US012803400B2

(12) United States Patent
Yu et al.

(10) Patent No.: US 12,803,400 B2
(45) Date of Patent: Nov. 17, 2026

(54) WINDING OVERHANG MACHINING METHOD, WINDING OVERHANG STRUCTURE, AND STATOR ASSEMBLY

(71) Applicant: UNITED AUTOMOTIVE ELECTRONIC SYSTEMS CO., LTD., Shanghai (CN)

(72) Inventors: Xingxiang Yu, Shanghai (CN); Daqian Jiang, Shanghai (CN); Kang Shao, Shanghai (CN); Changchun Xu, Shanghai (CN); Zhijun Zhan, Shanghai (CN); Xiufeng Hao, Shanghai (CN)

(73) Assignee: UNITED AUTOMOTIVE ELECTRONIC SYSTEMS CO., LTD., Shanghai (CN)

( * ) Notice: Subject to any disclaimer, the term of this patent is extended or adjusted under 35 U.S.C. 154(b) by 192 days.

(21) Appl. No.: 18/712,417

(22) PCT Filed: Nov. 29, 2022

(86) PCT No.: PCT/CN2022/134931

§ 371 (c)(1),
(2) Date: May 22, 2024

(87) PCT Pub. No.: WO2023/124701

PCT Pub. Date: Jul. 6, 2023

(65) Prior Publication Data

US 2025/0015683 A1 Jan. 9, 2025

(30) Foreign Application Priority Data

Dec. 31, 2021 (CN) ......................... 202111675381.X

(51) Int. Cl.
*H02K 15/35* (2025.01)
*B21F 3/08* (2006.01)
(Continued)

(52) U.S. Cl.
CPC ............... *H02K 15/35* (2025.01); *B21F 3/08* (2013.01); *B23K 26/21* (2015.10); *H02K 3/28* (2013.01); *H02K 3/38* (2013.01); *H02K 15/105* (2013.01)

(58) Field of Classification Search
CPC ........... H02K 15/35; H02K 3/28; H02K 3/38; H02K 15/105; H02K 3/50; H02K 15/0421;
(Continued)

(56) References Cited

U.S. PATENT DOCUMENTS

2010/0253161 A1 10/2010 Kuroyanagi
2014/0300236 A1 10/2014 Takizawa et al.
(Continued)

FOREIGN PATENT DOCUMENTS

CN 101785167 A 7/2010
CN 106849553 A 6/2017
(Continued)

*Primary Examiner* — Thomas Truong
(74) *Attorney, Agent, or Firm* — MUNCY, GEISSLER, OLDS & LOWE, P.C.

(57) ABSTRACT

A winding overhang machining method includes: cutting off corners of tip portions of conductors to form welding surfaces which are angled with respect to axes of the respective conductors; exerting a pushing force on each of the conductors, which have been inserted through an iron core so as to protrude out of the iron core, to form a bend in a base portion of the conductor so that the welding surfaces of two of the bent conductors to be connected together become contiguous and form a welding line; and connecting the two conductors together by performing laser welding on the welding surfaces. With this arrangement, a winding overhang structure can be obtained by processing the tip portions of the conductors with pushing forces but not drag forces.

19 Claims, 6 Drawing Sheets

(51) Int. Cl.

| | |
|---|---|
| ***B23K 26/21*** | (2014.01) |
| ***H02K 3/28*** | (2006.01) |
| ***H02K 3/38*** | (2006.01) |
| ***H02K 15/10*** | (2006.01) |

(58) Field of Classification Search
CPC .......... H02K 15/26; H02K 3/12; H02K 15/24; B21F 3/08; B23K 26/21
See application file for complete search history.

(56) References Cited

U.S. PATENT DOCUMENTS

| | | | | |
|---|---|---|---|---|
| 2015/0180319 | A1* | 6/2015 | Kimura | H02K 15/36 29/596 |
| 2017/0117782 | A1 | 4/2017 | Hirao | |
| 2017/0126106 | A1* | 5/2017 | Mizushima | H02K 15/085 |
| 2021/0273537 | A1 | 9/2021 | Toi | |
| 2022/0395923 | A1* | 12/2022 | Hofmann | B23K 26/32 |

FOREIGN PATENT DOCUMENTS

| | | | | | |
|---|---|---|---|---|---|
| CN | 106877583 | A | | 6/2017 | |
| CN | 108233575 | A | | 6/2018 | |
| CN | 108988593 | A | | 12/2018 | |
| CN | 217010494 | U | | 7/2022 | |
| CN | 217010647 | U | | 7/2022 | |
| JP | 2000164043 | A | * | 6/2000 | |
| JP | 2019097326 | A | | 6/2019 | |
| WO | WO-2021019749 | A1 | | 2/2021 | |
| WO | WO-2021048994 | A1 | | 3/2021 | |
| WO | WO-2021144900 | A1 | * | 7/2021 | H02K 15/04 |
| WO | WO-2021144937 | A1 | | 7/2021 | |

* cited by examiner

WINDING OVERHANG MACHINING METHOD, WINDING OVERHANG STRUCTURE, AND STATOR ASSEMBLY

TECHNICAL FIELD

The present invention relates to the technical field of electric machines and, in particular, to a winding overhang machining method, a winding overhang structure and a stator assembly.

BACKGROUND

Drive motors of electric vehicles (EV's) are one of the most crucial EV components because their service life and reliability are directly related to the life and safety of the vehicles. Therefore, for such motors, the reliability and compactness of winding designs are particularly important. Recent flat wire windings provide a much higher slot fill factor and good heat dissipation and thus can greatly improve peak and sustained performance of an electric motor.

In particular, I-pin windings can be produced very conveniently and exhibit high reliability and fault tolerance. Therefore, they have been widely used first in China.

As shown in FIGS. 1 and 2, the machining of a winding overhang 01 of an existing I-pin winding is typically accomplished using a tip twisting process generally involving, for each conductor, clamping a drag end 02 of a tip portion with a tool and exerting a drag force F to create two bends 03, 04 in the conductor. However, due to the presence of the drag end 02 above the bend 03, the I-pin winding overhang machined in this way has a great height, wasting material and leading to a large overall outer size. Moreover, the exertion of the drag force F may cause flaking of an insulation layer at the bend 03 and hence defects.

Therefore, I-pin windings are being faced with huge challenges from other types of flat wire motors and their scope of application is more and more limited.

SUMMARY OF THE INVENTION

It is an object of the present invention to provide a winding overhang machining method, a winding overhang structure and a stator assembly, which solve the above-described problems that conventional winding overhangs have, including a large overall size and possible damage to an insulation layer.

To this end, the present invention provides a winding overhang machining method, which comprises: cutting off corners of conductors to form welding surfaces which are angled with respect to axes of the respective conductors;

exerting a pushing force on each of the conductors, which have been inserted through an iron core so as to protrude out of the iron core, to form a bend in a base portion of the conductor so that the welding surfaces of two of the bent conductors to be connected together become contiguous and form a welding line; and connecting the two conductors together by performing laser welding on the welding surfaces.

Optionally, the two conductors to be connected together may be bent so that their welding surfaces are coplanar and/or that the welding line is perpendicular to an axis of the iron core.

Optionally, before the conductors are inserted through the iron core, the tip portion of each conductor may be subjected to a pre-processing step comprising thinning the tip portion of the conductor on a side facing towards another one of the conductors to be connected thereto, to form a connecting surface.

Optionally, the connecting surface may extend in a direction forming an angle with an axis of the iron core.

Optionally, during the laser welding, more energy may be applied around the middle of the welding line than around two ends thereof.

Optionally, the step of exerting the pushing force on each of the conductors, which have been inserted through the iron core so as to protrude out of the iron core, to form the bend in the base portion of the conductor may comprise:

exerting the pushing force on the tip portion of the conductor to form the bend in the base portion of the conductor until a final shape is obtained.

Optionally, the step of exerting the pushing force on each of the conductors, which have been inserted through the iron core so as to protrude out of the iron core, to form the bend in the base portion of the conductor may comprise:

exerting a pushing force on the base portion of the conductor to form an initial bend in the base portion of the conductor; and then exerting a pushing force on the tip portion of the conductor to additionally bend the conductor at the base portion until a final shape is obtained.

Optionally, the step of exerting the pushing force on each of the conductors, which have been inserted through the iron core so as to protrude out of the iron core, to form the bend in the base portion of the conductor may comprise:

exerting a pushing force on the base portion of the conductor to form an initial bend in the base portion of the conductor; and then successively exerting pushing forces on points on the conductor along a path leading from the base portion to the tip portion to additionally bend the conductor at the base portion until a final shape is obtained.

Optionally, the method may further comprise, before the pushing force is exerted on the base portion of the conductor, providing an auxiliary stopper and bringing it into abutment with the base portion of the conductor in a radial direction of the conductor.

Optionally, the method may further comprise, after the conductors are connected together by performing laser welding on their welding surfaces, forming a tip coating on the tip portions of the conductor using a coating process or a low-pressure overmolding process.

Optionally, during the formation of the bend in the base portion of each of the conductors, which have been axially inserted through the iron core so as to protrude out of the iron core, by exerting the pushing force on the conductor, only the pushing force may be exerted, in order to avoid a creation of a bend, which is curved in an opposite direction to the bend formed in the base portion, in a portion of conductor protruding out of the iron core.

Optionally, the method may be applied to an I-pin winding, wherein both axis end portions of conductors in the I-pin winding are processed according to the winding overhang machining method.

To the above end, the present invention also provides a winding overhang structure comprising two conductors connected together, each of the conductors inserted through an iron core so as to protrude out of the iron core, each of the conductors having a base portion where a bend is formed, each of the conductors comprising a tip portion having a welding surface formed by cutting off a corner of the conductor before it is inserted through the iron core, the welding surface forming an angle with an axis of the conductor, the welding surfaces of the two conductors being contiguous with each other and forming a welding line, the two conductors connected together by performing laser welding on the welding surfaces.

Optionally, the tip portion of each of the conductors may comprise a connecting surface facing towards the other one of the conductors, wherein the connecting surfaces of the two conductors are fully contacted with each other.

Optionally, the connecting surface and a body of each conductor may be located at different height in a direction in which the conductors are connected to each other, wherein the connecting surface is lower than the body of the conductor in the direction.

Optionally, the conductors may be flat wires each defining a width direction along its cross-sectional length thereof and a thickness direction along a cross-sectional width thereof, wherein each of the conductors is bent in the base portion in the width direction, and the connecting surfaces are located in the thickness direction of the flat wires.

Optionally, wherein a portion of each of the conductors that protrudes out of the iron core may not have a bend curved in an opposite direction to the bend in the base portion.

Optionally, the winding overhang structure may be applied to an I-pin winding comprising conductors, which are inserted through an iron core so as to protrude out of the iron core from opposite axial end portions thereof and each bent in the base portion, wherein the conductors protruding from the opposite axial end portions are bent in opposite directions.

Optionally, the winding overhang structure may further comprise a tip coating covering the tip portions of the conductors, wherein the tip coating is an electrical insulator.

Optionally, the connecting surfaces may extend in a direction forming an angle with an axis of the iron core.

Optionally, each of the connecting surfaces may comprise a beveled section and/or a curved section.

To the above end, the present invention also provides a stator assembly comprising an iron core and a winding disposed on the iron core, the winding comprising conductors implemented in the winding overhang structure as defined above.

Optionally, the stator assembly may comprise at least two conductor sets each formed by the conductors arranged circumferentially around the iron core at a same radius, the conductor sets arranged at different radial distances from the iron core, all the conductors in each conductor set bent in a same direction, conductors in adjacent two of the conductor sets bent in opposite directions, the conductors in each conductor set connected to the conductors in an adjacent one of the conductor sets in pairs.

Optionally, wherein the conductors in different ones of conductor sets are aligned at same circumferential positions, wherein the conductors in each connected pair are spaced from each other by five of the circumferential positions.

In summary, the present invention provides a winding overhang machining method, a winding overhang structure and a stator assembly. The method includes: cutting off corners of tip portions of conductors to form welding surfaces which are angled with respect to axes of the respective conductors; exerting a pushing force on each of the conductors, which have been inserted through an iron core so as to protrude out of the iron core, to form a bend in a base portion of the conductor so that the welding surfaces of two of the bent conductors to be connected together become contiguous and form a welding line; and connecting the two conductors together by performing laser welding on the welding surfaces.

With this arrangement, a winding overhang structure can be obtained by processing the tip portions of the conductors with pushing forces but not drag forces. This dispenses with the need to reserve drag areas on the tip portions, allowing the winding overhang to have a reduced height and hence a smaller overall outer size. Moreover, joining the bent conductors by performing laser welding on the welding surfaces formed by cutting off corners of the tip portions of the conductors will not cause damage to any insulation layer around the welding surfaces, thus effectively enhancing winding reliability.

BRIEF DESCRIPTION OF THE DRAWINGS

Those of ordinary skill in the art would appreciate that the following drawings are presented merely to enable a better understanding of the present invention rather than to limit the scope thereof in any sense, in which.

Figure 1:
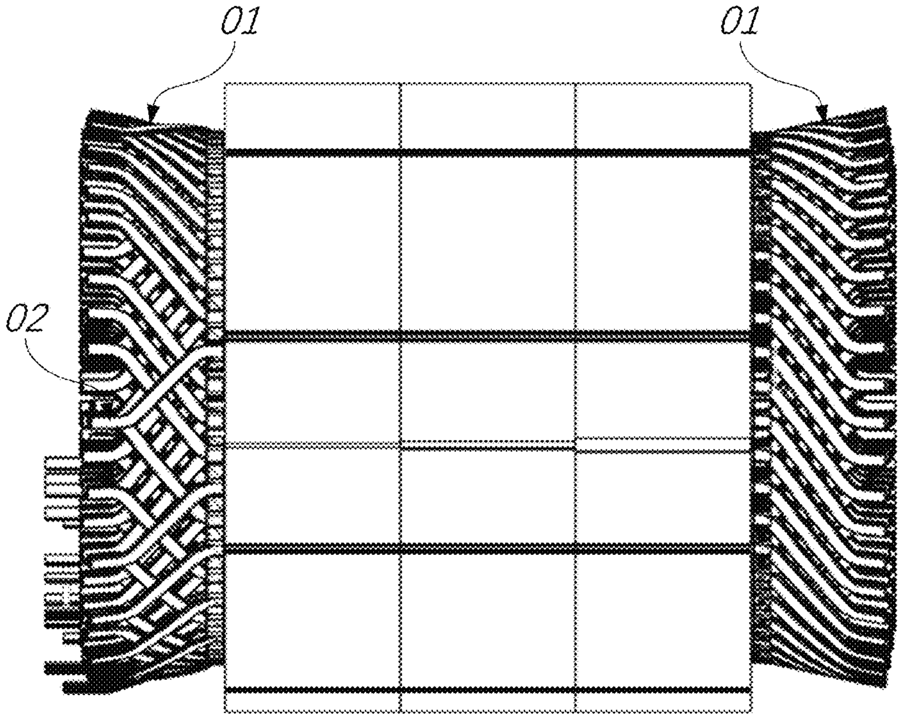
FIG. 1 is a schematic overview of a stator assembly machined by a tip twisting process.

In these figures, 01 denotes a winding overhang; 02, a drag end; 03, 04, a bend; 10, a conductor; 11, a bend; 12, a welding surface; 13, a welding line; 14, a connecting surface; 15, a tip coating; 20, an iron core; 21, a winding; 31, a first point of force application; 32, a second point of force application; 33, a path of force application; 40, an auxiliary stopper.

DETAILED DESCRIPTION

Objects, features and advantages of the present invention will become more apparent upon reading the following more detailed description, which is set forth by way of particular embodiments with reference to the accompanying drawings. Note that the figures are provided in a very simplified form not necessarily drawn to exact scale for the only purpose of helping to explain the disclosed embodiments in a more convenient and clearer way. In addition, structures shown in the figures are usually part of actual structures. In particular, as the figures tend to have distinct emphases, they are often drawn to different scales.

As used herein, the singular forms "a", "an" and "the" include plural referents. As used herein, the term "or" is generally employed in the sense of "and/or", "several" of "at least one" and "at least two" of "two or more". Additionally, the use of the terms "first", "second" and "third" herein is intended for illustration only and is not to be construed as denoting or implying relative importance or as implicitly indicating the numerical number of the referenced item. Accordingly, defining an item with "first", "second" or "third" is an explicit or implicit indication of the presence of one or at least two such items. As used herein when describing a conductor that protrudes out of a stator iron core, the term "tip portion" refers to an end portion of the conductor farther away from the stator iron core, and the term "base portion" refers to an end portion of the conductor closer to the stator iron core. The terms "one end" and "the other end", as well as "proximal end" and "distal end", are generally used to refer to opposing ends including the opposing endpoints, rather than only to the endpoints. The terms "mounting", "coupling" and "connection" should be interpreted in a broad sense. For instance, a connection may be a permanent, detachable or integral connection, or a mechanical or electrical connection, or a direct or indirect connection with one or more intervening media, or an internal communication or interaction between two elements. As used herein, when an element is referred to as being "disposed on" another element, this is generally intended to only mean that there is a connection, coupling, engagement or transmission relationship between the two elements, which may be either direct or indirect with one or more intervening elements, and should not be interpreted as indicating or implying a particular spatial position relationship between the two elements, i.e., the element may be located inside, outside, above, under, beside, or at any other location relative to the other element, unless the context clearly dictates otherwise. Those of ordinary skill in the art can understand the specific meanings of the above-mentioned terms herein, depending on their context.

It is an object of the present invention to provide a winding overhang machining processing, a winding overhang structure and a stator assembly, which solve the problems that conventional winding overhangs have, including a large overall size and possible damage to an insulation layer.

A description is set forth with reference to the accompanying drawings.

Figure 2:
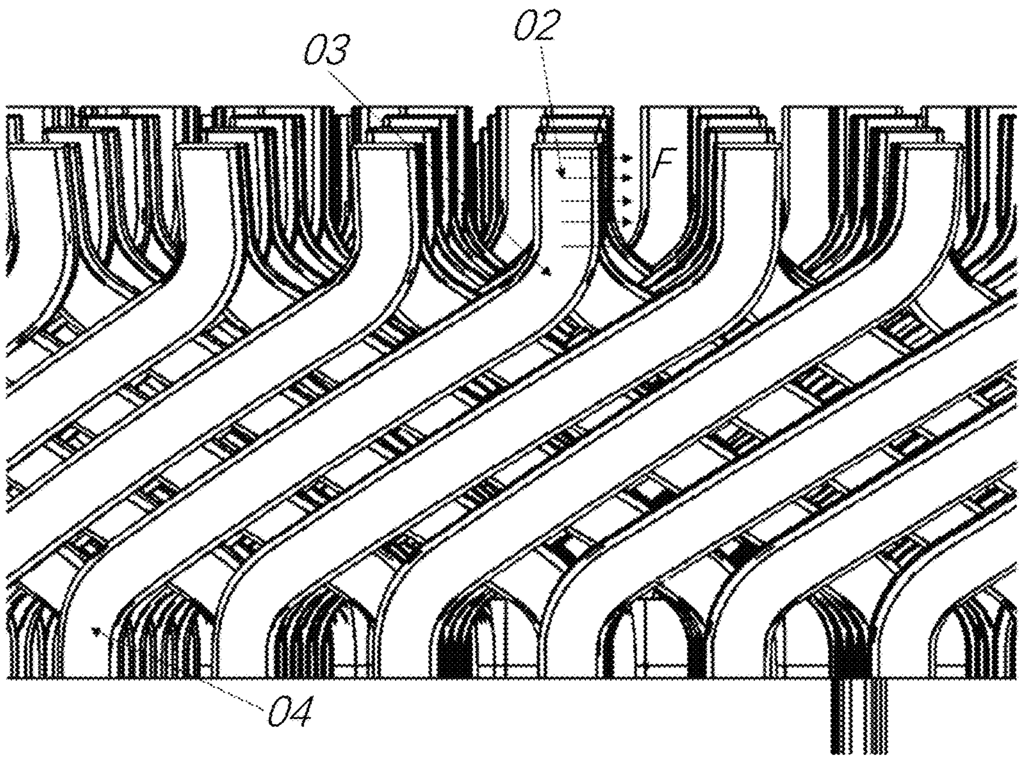
FIG. 2 is a schematic illustration of a winding overhang structure machined by a tip twisting process.

The inventors have found through extensive research that, in the winding overhang structure machined by the tip twisting process shown in FIGS. 1 and 2, although the presence of the drag end 02 is undesirable for a compact overall outer size, the relatively long drag end 02 allows convenient welding. Specifically, as a consequence of clamping the drag end 02 and exerting a drag force on the conductor, the insulation layer (e.g., a paint layer) that coats the conductor may crack. Generally, the drag end 02 of the conductor is a non-painted bare region, and a boundary where the remaining painted region and the non-painted bare region meets is formed at the bend 03. Therefore, performing a conventional welding process on the tip portion (which is an upper portion, as viewed in the orientation of FIG. 2) of the drag end 02 would not affect the paint layer below the bend 03 because of a considerable length of the drag end 02 for transition. Therefore, while the existing tip twisting process may cause flaking of the paint layer at the bend 03, it allows a welding process to be carried out without a considerable impact on the paint layer.

In order to reduce the height of the winding overhang structure, as shown in FIGS. 3 to 5*f*, according to embodiments of the present invention, it is proposed to machine a winding overhang structure by applying pushing forces to such conductors 10. In this way, as it is no longer necessary to apply drag forces to tip portions of the conductors 10, it is unnecessary to reserve drag areas on the tip portions, resulting in reductions in the height of the winding overhang and hence in its overall outer size. Moreover, since it is no longer necessary to reserve drag areas, each conductor 10 can be coated with an insulation layer that extends up to the tip portion. This can prevent a short circuit or other issues that may arise after an end winding is formed. However, when a conventional welding process (e.g., brazing, electric-resistance welding or the like) is performed on the tip portion, the insulation layer near the tip portion tends to be affected, and detachments or other defects may be caused around the location being welded. The inventors have found through extensive research that this can be overcome by cutting off corners of the tip portions of the conductors 10 to form welding surfaces 12 and bending the conductors 10 so that their welding surfaces 12 become contiguous and form welding lines 13. Laser welding can be then performed on the welding surfaces 12 without causing damage to any insulation layer around the welding surfaces 12, effectively enhancing winding reliability.

Figure 3:
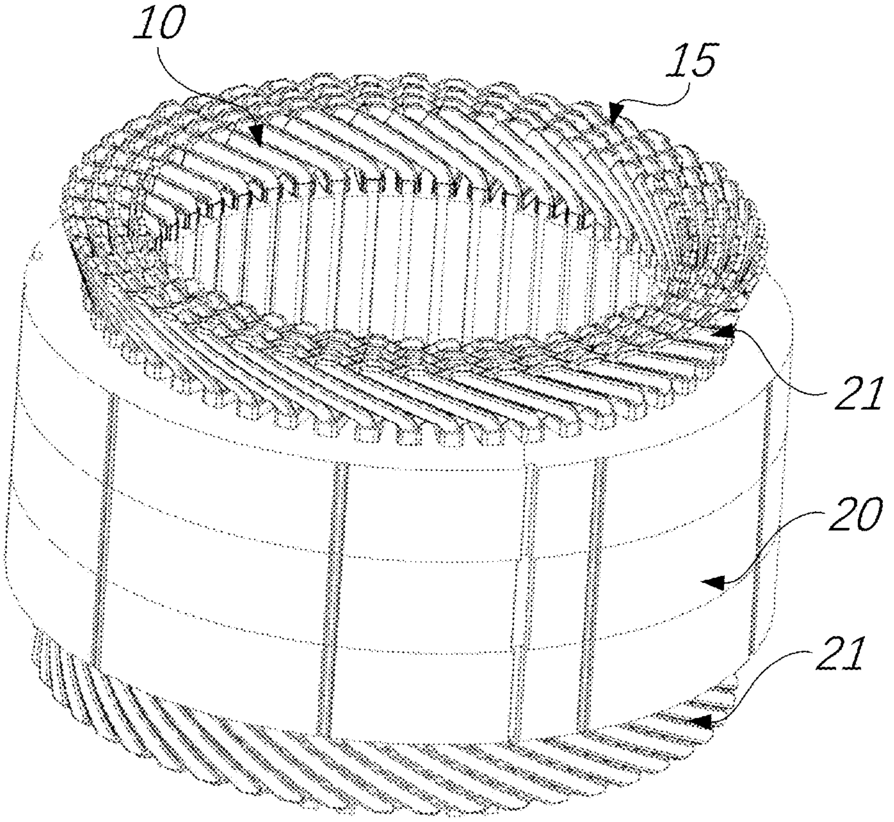
FIG. 3 is a schematic overview of a stator assembly according to an embodiment of the present invention.
Figure 4:
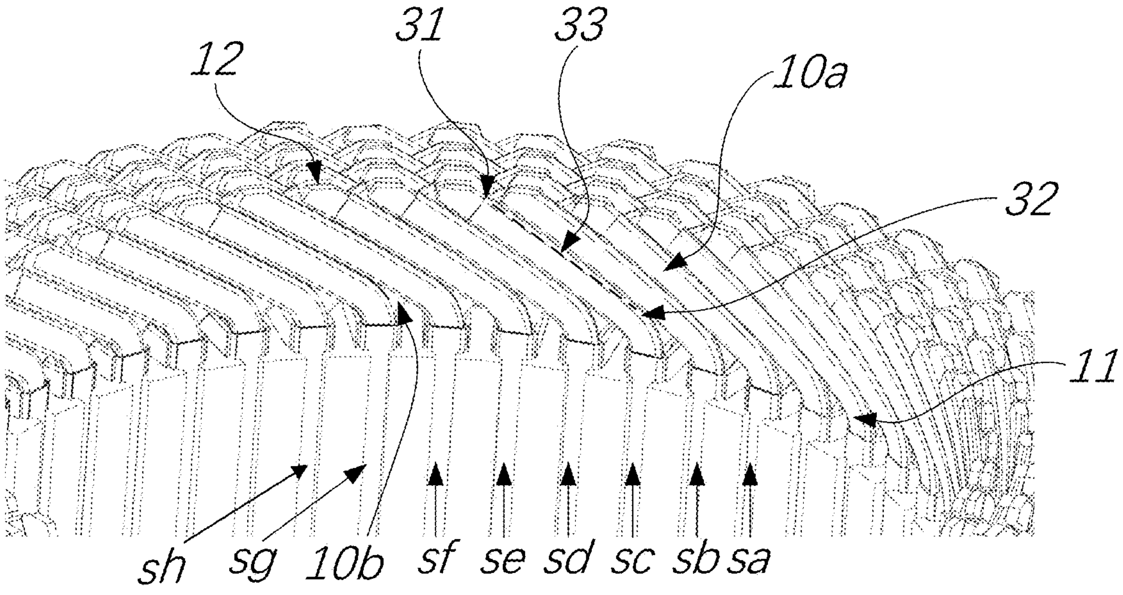
FIG. 4 is a schematic illustration of a winding overhang structure according to an embodiment of the present invention.

Based on the aforementioned research, referring to FIGS. 3 to 5*f*, embodiments of the present invention provide a winding overhang structure includes two conductors 10 to be connected together. Each conductor 10 protrudes out of an iron core 20 and has a bend 11 in its base portion. A tip portion of each conductor 10 has a welding surface 12 which is formed by cutting off a corner of the conductor before it is inserted through the iron core 20. The welding surface 12 is angled with respect to an axis of the conductor 10. The welding surfaces 12 of the two conductors 10 to be connected together are contiguous with each other, thus forming a welding line 13 therebetween. The two conductors 10 are connected together by performing laser welding on the welding surfaces 12. Referring to FIG. 4, here, the two conductors 10 to be connected together are two conductors 10 required to be connected to each other according to a winding arrangement. In practice, the two conductors 10 to be connected together are usually of the same phase. FIG. 5*a* shows one example of a typical cell of the winding overhang structure, which consists of the two bent conductors 10 to be connected together. It is to be understood that the two conductors 10 to be connected together are bent in opposite directions so that they can be connected in a crossover configuration. In addition, it is to be noted that the welding line 13 is formed by contiguous and coincident edges of the two welding surfaces 12. Specifically, the two welding surfaces 12 should be appropriately configured with respect to the axes of the respective conductors 10 so that the two conductors 10 can be bent to bring the contiguous edges of the two welding surfaces 12 into coincidence to form the welding line 13. If the contiguous edges of the two welding surfaces 12 form an angle therebetween, as shown in FIG.

5*b*, the welding line 13 will not be formed. When this happens, the subsequent laser welding will be difficult to perform.

Embodiments of the present invention also provide a winding overhang machining, which can be used in the manufacture of the above-described winding overhang structure. The method includes the steps as follows.

Step 1: Cut off corners of tip portions of conductors 10 to form welding surfaces 12 which are angled with respect to axes of the respective conductors 10.

Step 2: Exert a pushing force on the conductors 10, which have been inserted through an iron core so as to protrude out of the iron core, to form a bend 11 in a base portion of the conductor 10 so that the welding surfaces 12 of two of the bent conductors 10 to be connected together become contiguous and form a welding line 13.

Step S3: Connect the two conductors 10 together by performing laser welding on their welding surfaces 12.

If the corners are cut off after the conductors 10 have been inserted through the iron core 20, the cutting process would be difficult to perform, and it would be difficult to ensure an accurate cutting angle. Consequently, it would be difficult to ensure that the welding surfaces 12 can become contiguous to form the welding line 13. Therefore, it is preferred that the step of cutting off the corners of the tip portions of the conductors 10 to form the welding surfaces 12 is carried out before the conductors 10 are inserted through the iron core 20.

Figure 5A:
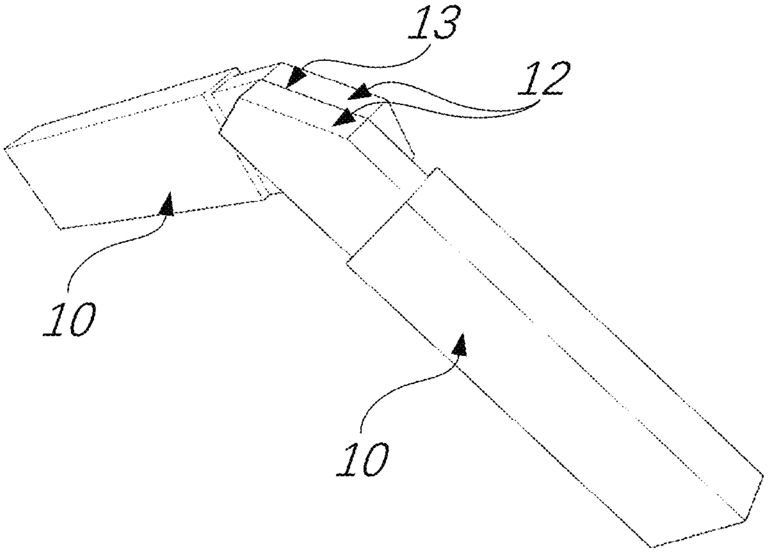
FIG. 5*a* is a schematic illustration of a typical cell of a winding overhang structure according to an embodiment of the present invention, in which welding surfaces are coplanar and form a welding line.
Figure 5B:
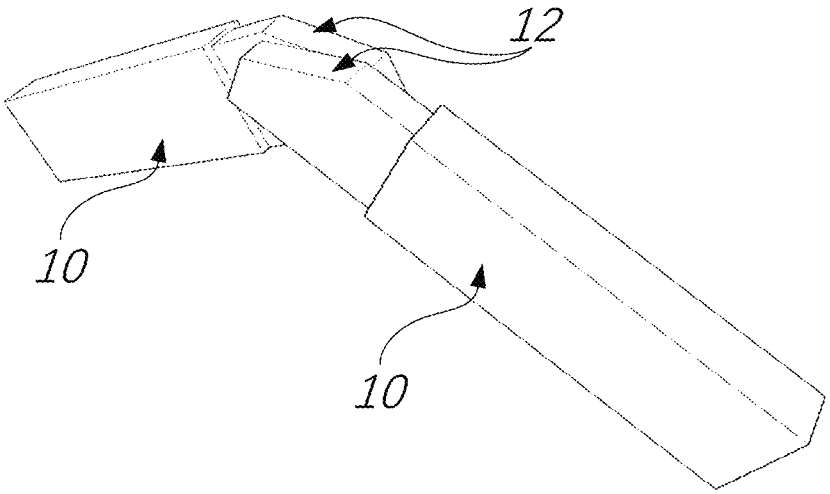
FIG. 5*b* is a schematic illustration of an embodiment of the present invention, in which welding surfaces cannot form a welding line.

Preferably, the two conductors 10 to be connected together are bent so that their welding surfaces 12 are coplanar and/or that the welding line 13 is perpendicular to an axis of the iron core 20. In one exemplary embodiment, as shown in FIG. 5*a*, the two conductors 10 to be connected together are bent so that their welding surfaces 12 are coplanar and contiguous with each other to form the welding line 13. When this is achieved, laser welding can be conveniently performed on the welding surfaces 12 to create a reliable electrical connection between the two conductors 10. Moreover, since energy is essentially concentrated along the welding line 13 in the laser welding process, its influence on paint layers that coat the conductors 10 can be effectively reduced, effectively enhancing winding reliability. Preferably, as shown in FIG. 4, both coplanar welding surfaces 12, and hence the welding line 13, may be perpendicular to the axis of the iron core 20 (extending vertically as viewed in the orientation of the figure). This can facilitate the subsequent laser welding process. Of course, in some embodiments, the welding line 13 may form a different angle with the axis of the iron core 20, without being limited to being perpendicular to the axis, as long as the welding line 13 is completely exposed to the laser welding machine used.

Figure 5C:
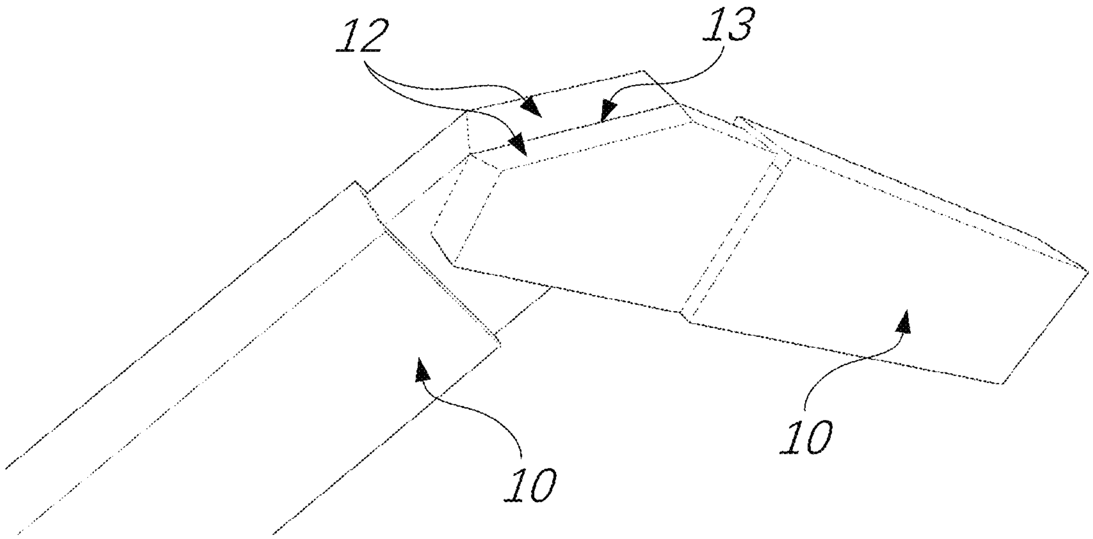
FIG. 5*c* is a schematic illustration of a typical cell of a winding overhang structure according to an embodiment of the present invention, in which welding surfaces are concavely angled with respect to each other and form a welding line.
Figure 5D:
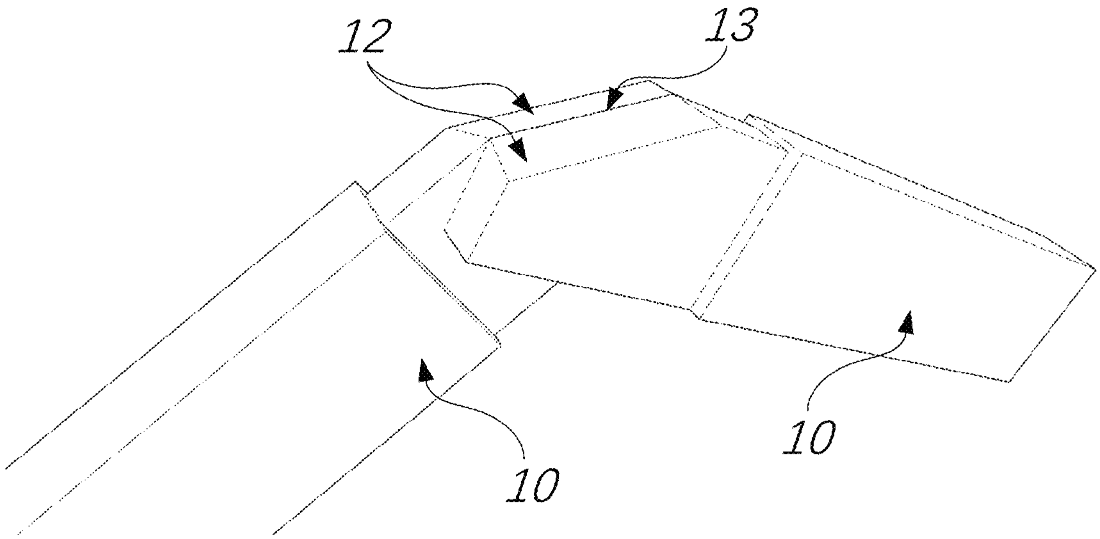
FIG. 5*d* is a schematic illustration of a typical cell of a winding overhang structure according to an embodiment of the present invention, in which welding surfaces are convexly angled with respect to each other and form a welding line.

In some other embodiments, as shown in FIGS. 5*c* and 5*d*, the two conductors 10 to be connected together are bent so that their welding surfaces 12 are not coplanar, because these surfaces are beveled with respect to the respective conductors 10. However, these contiguous edges are also brought into coincidence to form the welding line 13. In these embodiments, laser welding can also be performed on the welding surfaces 12. It is to be understood that, while the welding surfaces 12 are flat in each of the foregoing embodiments, in some other embodiments, it is also possible that the welding surfaces 12 are curved. Accordingly, the welding line 13 is not limited to being straight, but may be curved. These skilled in the art may make various modifications in practical applications, without departing from the scope of the present invention.

Preferably, in the laser welding process, energy is more concentrated around the middle of the welding line 13 than at its two ends. The inventors have found through extensive research that if energy is evenly distributed along the welding line 13 in the laser welding process, the insulation layers around the ends of the welding line 13 are more likely to be affected. Moreover, in practice, it is not necessary to weld the two conductors 10 across the entire length of the welding line 13, because a reliable electrical connection can be effectively ensured simply by welding them together in a reliable manner around the middle of the welding line 13. Therefore, according to embodiments of the present invention, energy is more concentrated around the middle of the welding line 13 than at its two ends. This can ensure that a reliable electrical connection is created between the two conductors 10 around the middle of the welding line 13. At the same time, with the aid of heat transferred from the middle portion, welding can be achieved around the ends of the welding line 13 with less laser energy. With this arrangement, the insulation layers around the ends of the welding line 13 can be prevented from being affected.

Figure 5E:
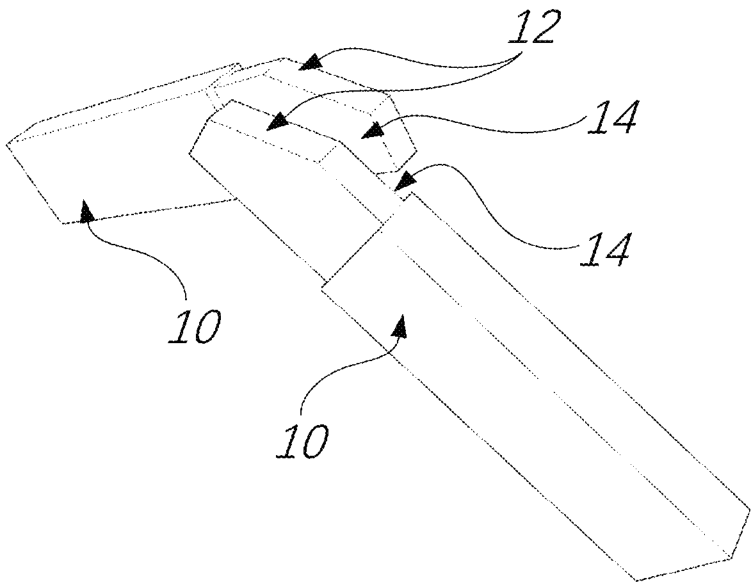
FIG. 5*e* is a schematic illustration of conductors in a winding overhang structure according to an embodiment of the present invention, which have not been bonded to each other yet.

Optionally, with continued reference to FIG. 5*e*, the tip portion of each of the conductors 10 to be connected together may have a connecting surface 14 facing the other conductor 10. The two conductors 10 may be connected to each other so that the connecting surfaces 14 thereof are fully contacted. FIG. 5*e* shows the two conductors 10 that have not been connected to each other yet. The connecting surfaces 14 of the tip portions of the two conductors 10 may be oriented towards each other. The two conductors 10 may be connected to each other so that the connecting surfaces 14 thereof are fully contacted, as shown in FIG. 5*a*. With this arrangement, a reliable electrical connection can be created between the two conductors 10 using a welding process.

Figure 5F:
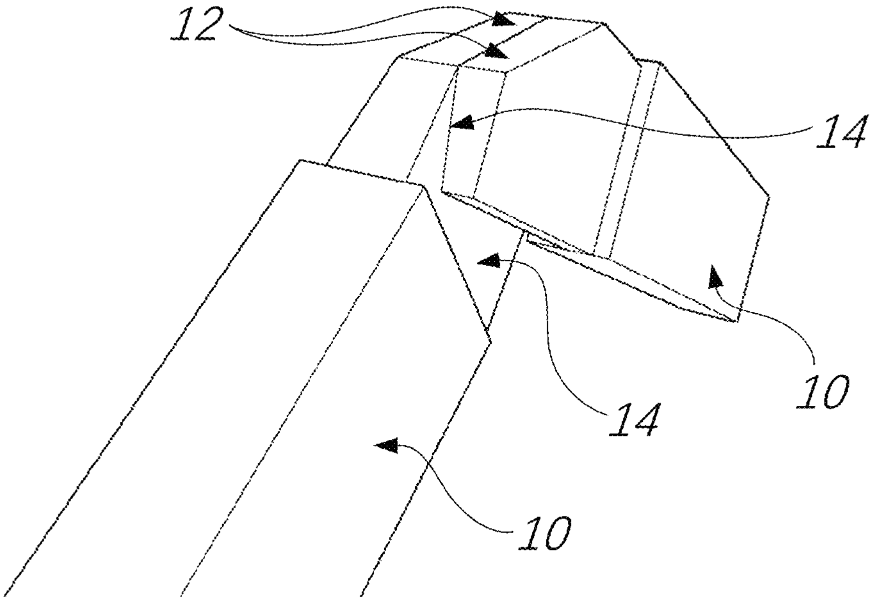
FIG. 5*f* is a schematic illustration of a typical cell of a winding overhang structure according to an embodiment of the present invention, in which connecting surfaces are slanted with respect to an axis of an iron core.

Optionally, referring to FIG. 5*f*, in some embodiments, the connecting surfaces 14 may extend in a direction which forms an angle with the axis of the iron core 20. In order to facilitate welding, a laser beam is usually projected along the axis of the iron core 20 that is substantially perpendicular to the welding surfaces 12. The inventors have found that, if the connecting surfaces 14 extend in parallel to the laser beam, they may be burned through in some circumstances. Through tilting the connecting surfaces 14 with respect to the axis of the iron core 20, an angle can be formed between the connecting surfaces 14 of the two conductors 10 and the laser beam, which can avoid the connecting surfaces from being burned through.

Preferably, each connecting surface 14 includes a beveled section and/or a curved section. The slanting of the connecting surfaces 14 with respect to the axis of the iron core 20 may be implemented in many different ways. FIG. 5*f* shows one exemplary implementation, in which the tip portions of the conductors 10 are thinned into wedge shapes so that the tip portions of the two conductors 10 have opposing beveled sections which are slanted in the same direction. In the exemplary implementation of FIG. 5*f*, the tip portion of the right conductor 10 is shaped into a downwardly tapered wedge, while the tip portion of the left conductor 10 is shaped into an upwardly tapered wedge. It is to be understood that, in this case, the connecting surfaces 14 of the two conductors 10 are fully contacted, but both slanted with respect to axis of the iron core 20.

In some alternative implementations, the opposing connecting surfaces 14 of the two conductors 10 may include complementarily curved sections. For example, the two may be ground into complementary wavy or arcuate shapes, which can reduce the probability of the surfaces being burned through. In further alternative non-limiting implementations, the tip portions of the conductors 10 may be twisted so as to have connecting surfaces 14 slanted with respected to the axis of the iron core 20.

Preferably, referring to FIG. 4, the conductors 10 are flat wires defining a width direction along their cross-sectional lengths and a thickness direction along their cross-sectional widths and are bent at the base portions in the width directions. Moreover, the connecting surfaces 14 are normal to the thickness direction.

Further, referring to FIG. 5*e*, for each conductor 10, the connecting surface 14 and a body of the conductor 10 are located at different heights, as viewed in the direction in which the conductors 10 are to be connected. In this direction, the connecting surface 14 is lower than the body of the conductor 10. The direction in which the conductors 10 are to be connected are normal to the connecting surfaces 14. That is, it is the thickness direction of the flat wires shown in FIG. 5*e*. In the direction in which the conductors 10 are to be connected, there is a step between the connecting surface 14 and the body of the conductor 10. By the phase "the connecting surface 14 is lower than the body of the conductor 10", it is intended to mean that the distance at which the connecting surface 14 is spaced from the other conductor 10 to be connected thereto is greater than a distance at which the body of the conductor 10 is spaced from the other conductor 10. With this arrangement, after being connected to each other at the connecting surfaces 14, the two conductors 10 are allowed to have a reduced total thickness in the direction in which they are connected. This can prevent their influence on an adjacent pair of conductors 10.

The connecting surfaces 14 are preferred to be processed before the conductors 10 are inserted through the iron core 20. Specifically, in the winding overhang machining method, before the conductors 10 are inserted through the iron core 20, the tip portions are subjected to a pre-processing step including thinning the tip portion of each conductor 10 in the direction in which it is to be connected to another one of the conductors 10 and thereby forming the connecting surface 14. After the thinning process is completed, the connecting surface 14 is lower than the body of the conductor 10 in the direction in which the conductors 10 are to be connected, resulting in a step therebetween in the same direction.

In some embodiments, in addition to being thinned on the side facing towards the other conductor 10 to be connected thereto, each conductor 10 may also be thinned on the side facing away from the other conductor 10. In this way, each conductor 10 is suitable to be connected on both sides in the thickness direction. This allows random choice of conductors 10 during assembly, without being limited to any particular order in which the conductors 10 are connected. That is, in the thickness direction, it is possible either to connect a conductor A to a conductor B, or to connect the conductor B to the conductor A.

With reference to FIG. 4, the step of exerting the pushing force on each of the conductors 10, which have been inserted through the iron core so as to protrude out thereof, to form the bend in the base portion of the conductor 10 will be described below, with respect to several exemplary embodiments.

In a first exemplary embodiment, the step of exerting the pushing force on each of the conductors 10, which have been inserted through the iron core so as to protrude out thereof, to form the bend in the base portion of the conductor 10 includes exerting the pushing force on the tip portion of each conductor 10 to form the bend in the base portion of each conductor 10 until a desired final shape is obtained. It is to be noted that, here, the exertion of the pushing force on the tip portion of each conductor 10 should not be interpreted in a narrow sense as "exerting the pushing force on a tip end of each conductor 10", but should be interpreted in a broad sense as "exerting the pushing force on any point in an end portion of the conductor encompassing the tip end". For example, in the example shown in FIG. 4, the point where the pushing force is applied to the tip portion can be generally described as a first point 31 of force application which is close to the tip end of the conductor 10. It is to be understood that the pushing force is exerted essentially in the aforementioned width direction of the conductor 10 to ensure the conductor 10 to be bent in the base portion in the width direction. Although directly exerting the pushing force only on the first point 31 of force application on the tip portion can be accomplished by a simple operation, it tends to overall curve the conductor 10, in addition to the desired bend in the base portion.

In a second exemplary embodiment, the step of exerting the pushing force on each of the conductors 10, which have been inserted through the iron core so as to protrude out thereof, to form the bend in the base portion of the conductor 10 includes: exerting a pushing force on the base portion of each conductor 10 to create an initial bend in the base portion; and exert a pushing force on the tip portion of the conductor 10 to additionally bend the conductor 10 at the base portion until a desired final shape is obtained. Likewise, it is to be noted that, here, the exertion of the pushing force on the tip or base portion of the conductor 10 should not be interpreted in a narrow sense as "exerting the pushing force on the tip end or a base end of each conductor 10", but should be interpreted in a broad sense as "exerting the pushing force on any point in an end portion encompassing the tip or base end". For example, in the example shown in FIG. 4, the point where the pushing force is applied to the tip portion can be generally described as a first point 31 of force application, and the point where the pushing force is applied to the base portion as a second point 32 of force application. The pushing force first exerted on the second point 32 of force application on the base portion can create an initial bend in the base portion, and the pushing force later exerted on the first point 31 of force application on the tip portion can additionally bend the conductor 10 at the base portion. This multi-step bending approach allows the resulting conductors 10 to be less overall curved and maintain a relatively straight shape.

In a third exemplary embodiment, the step of exerting the pushing force on each of the conductors 10, which have been inserted through the iron core so as to protrude out thereof, to form the bend in the base portion of the conductor 10 includes: exerting a pushing force on the base portion of each conductor 10 to create an initial bend in the base portion; and successively exerting pushing forces on points on the conductor 10 along a path leading from the base portion to the tip portion to additionally bend the conductor 10 at the base portion until a desired final shape is obtained. For example, in the example shown in FIG. 4, any point where a pushing force is applied to the tip portion can be generally described as a first point 31 of force application, any point where a pushing force is applied to the base portion as a second point 32 of force application, and the path leading from the base portion to the tip portion as a path 33 of force application. This bending approach also allows the resulting conductors 10 to be less overall curved and maintain a relatively straight shape.

Preferably, during the creation of the bend in the base portion of each of the conductors 10 which have been inserted through the iron core so as to protrude out thereof, pushing force(s) is/are only exerted on the conductor 10 to prevent the formation of a bend curved in an opposite direction to that in the base portion. That is, no bend curved in an opposite direction to that in the base portion will be created in the conductor 10. Compared with the conventional method using a drag force, exerting only pushing force(s) can ensure that no bend curved in an opposite direction to that in the base portions will be created in the conductor 10. It is to be understood that such opposite bends will increase the height of the winding overhang and waste space and material. In contrast, exerting only pushing force(s) can not only prevent the formation of an opposite bend, but also reduce a torque required during force application and mitigate the problems associated with exerting a drag force, such as the flaking of an insulation layer.

Figure 6:
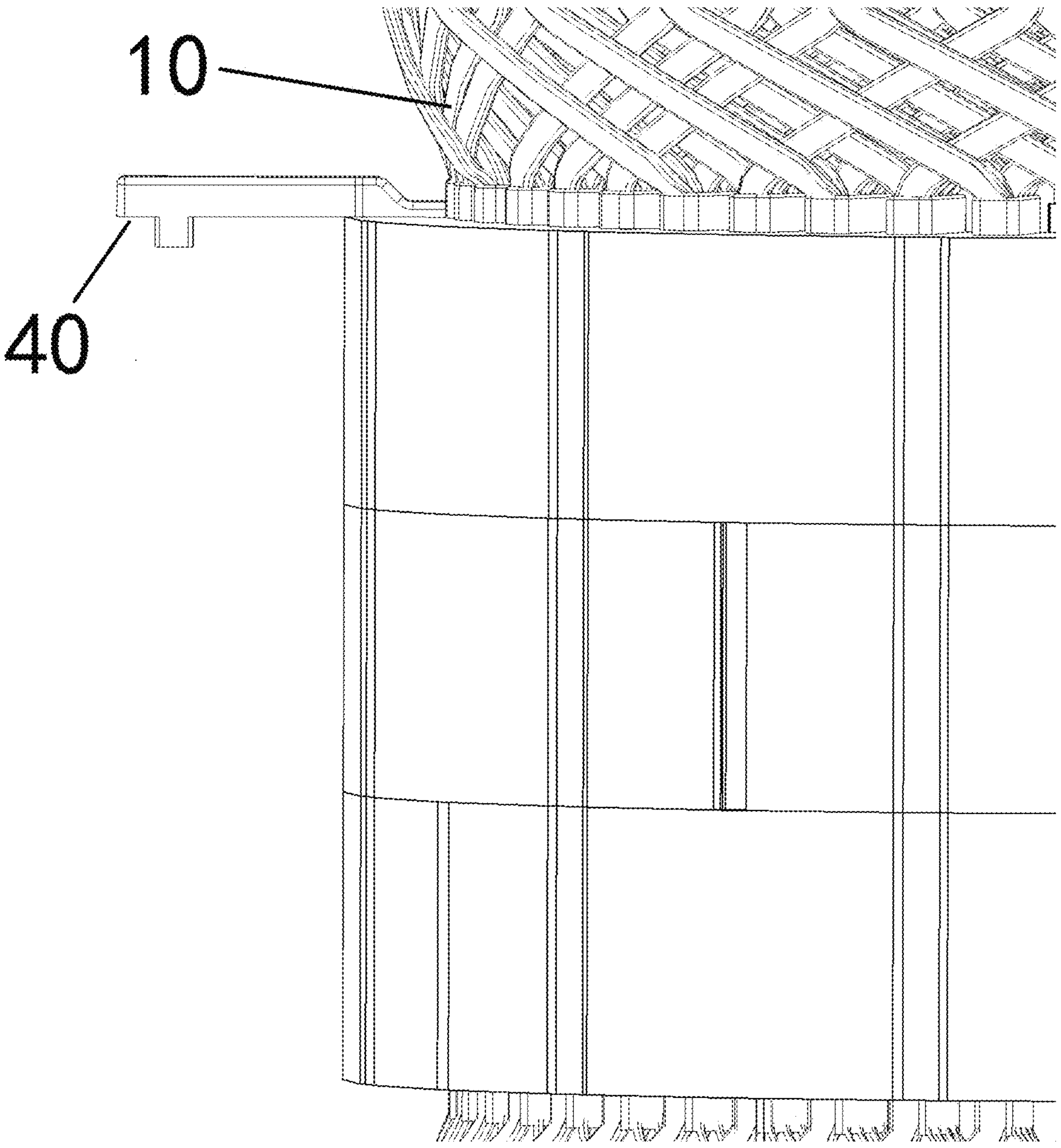
FIG. 6 illustrates the use of an auxiliary stopper (40) during the bending process.

Optionally, as shown in FIG. 6, before the pushing force is exerted on the base portion of each conductor 10, the method may further include providing an auxiliary stopper 40 and bringing it into abutment with the base portion of the conductor 10 in a radial direction of the conductor 10 to provide radial support. For example, the auxiliary stopper 40 may be cylindrical and can restrict the base portion of the conductor 10 to allow the bend to be created at a location closer to the base end.

The winding overhang structure may further include a tip coating 15 which covers the tip portion of each conductor 10. The tip coating 15 may be an electrical insulator. It is to be noted that, here, the tip portion of the conductor 10 should not be interpreted in a narrow sense as the tip end of the conductor 10, but should be interpreted in a broad sense as an end portion thereof encompassing the tip end. For example, the tip coating 15 may cover, among others, the aforementioned welding surfaces 12 and backsides opposite to the aforementioned connecting surfaces 14. Examples of the electrical insulator of the tip coating 15 may include polymer-impregnated paints, epoxy resins, etc. The tip coating 15 may be formed using a coating process, or a low-pressure overmolding process, for example. Accordingly, after the conductors 10 are connected by laser welding performed on the welding surfaces 12, the method may further include, in step S4, forming the tip coating 15 on the tip portion of each conductor 10 using a coating process or a low-pressure overmolding process. The tip coating 15 can provide physical protection to the welding surfaces 12 in the winding overhang and prevent the connected conductors 10 from being separated from each other. Moreover, it can insulate the welding surfaces 12 and prevent the occurrence of a short circuit between the winding and another component such as a housing.

Referring to FIG. 3, the winding overhang structure is applied to an I-pin winding. The axial end portions of each conductor 10 protrude out of the iron core 20. The conductors 10 are bent at their base portions in opposite directions. In one exemplary embodiment, as shown in FIG. 3, conductors 10 are passed through the iron core 20, with their upper portions protruding out of the iron core 20 and being bent clockwise with respect to the iron core 20 and with their lower portions protruding out of the iron core 20 and being bent counterclockwise with respect to the iron core 20. That is, the two portions of each conductor 10 are bent in opposite directions.

Accordingly, the above-described winding overhang machining method is applicable to an I-pin winding. In this case, opposite axial end portions of each conductor 10 in the I-pin winding may be both processed according to the method. Compared to conventional tip twisting processes for use with I-pin windings, processing opposing overhangs of an I-pin winding according to the method of the present invention allows both overhangs to have a reduced height. It is to be understood that the method and winding overhang structure of the invention are also applicable to a hairpin winding. One overhang of the hairpin winding is preformed by bending, and the method and structure can be applied to the other overhang thereof.

On the basis of the above-described winding overhang structure, in embodiments of the present invention, there is also provided a stator assembly including an iron core 20 and a winding 21 disposed on the iron core 20. Conductors 10 in the winding 21 are processed in the same way as in the above-described winding overhang structure. The stator assembly is exemplified with reference to FIGS. 3 and 4.

In the exemplary embodiment of FIG. 3, a plurality of conductors 10 are arranged circumferentially around the iron core 20 at the same radius to form a conductor set. That is, the conductors 10 in the conductor set are arranged on the same circumference, as shown in FIG. 3. The stator assembly may include at least two such conductor sets arranged at different radial distances from the iron core 20. The conductors 10 in each conductor set are bent in the same direction, and the conductors 10 in radially adjacent conductor sets are bent in opposite directions and connected in pairs. Specifically, in the exemplary embodiment of FIG. 3, the stator assembly includes 8 conductor sets. When counted from the outermost conductor set to the innermost conductor set, all the conductors 10 in each odd-numbered conductor set are inserted through the iron core and bent clockwise in their upper portions and counterclockwise in their lower portions, and all the conductors 10 in each even-numbered conductor set are inserted through the iron core and bent counterclockwise in their upper portions and clockwise in their lower portions. With this arrangement, the conductors 10 in radially adjacent conductor sets are bent in opposite directions and can connected in pairs.

Referring to FIG. 4, the conductors 10 in different conductor sets are preferred to be aligned at the same circumferential positions, as described in detail below. Each conductor 10 is inserted through the iron core 20 at a particular circumferential position. For example, when viewed from the top, the stator assembly may define a predetermined set of circumferential positions, in which, for example, the 12 o'clock position may be taken as a 0-degree position, and the other circumferential positions may correspond to different clockwise increments. By the phrase "aligned at the same circumferential positions", it is intended to mean that the conductors 10 in each conductor set are aligned at the same set of circumferential positions with respect to the iron core 20. In an illustrative example, each conductor set includes only six conductors 10, and the circumferential positions are accordingly defined as the 0-, 60-, 120-, 180-, 240- and 300-degree positions. In this case, the phrase "aligned at the same circumferential positions" means that the conductors 10 in all the conductor sets are aligned at the 0-, 60-, 120-, 180-, 240- and 300-degree circumferential positions. With this arrangement, the conductors 10 in the conductor sets are aligned into straight lines radiating from the center of the iron core 20 in corresponding radial directions. It is to be noted that the number of conductors 10 in each conductor set described in the above example is merely a non-limiting example, and those skilled in the art can properly configure the number in practical applications.

Furthermore, the conductors 10 in each connected pair may be circumferentially spaced apart by five circumferential positions. Preferably, the stator assembly may have three alternating phases each spanning two circumferential positions. For example, as shown in FIG. 4, the conductors 10 at circumferential positions sa, sb are both of phase A; the conductors 10 at circumferential positions sc, sd are both of phase B; the conductors 10 at circumferential positions se, sf are both of phase C; the conductors 10 at circumferential positions sg, sh are both of phase A; and so forth. Generally, each connected pair of conductors 10 is of the same phase. Since the three phases alternate, each connected pair of the same phase may be circumferentially spaced apart by five circumferential positions. For example, a counterclockwise bent conductor 10*a* of the innermost conductor set at the circumferential position sa may be connected to a conductor 10*b* of the second innermost conductor set at the circumferential position sg and spaced therefrom by the five circumferential positions sb, se, sd, se, sf.

Optionally, the stator assembly may further include a tap, which may be connected to the conductors 10 in the winding according to a method known in the art. Further description thereof is omitted herein.

In summary, the present invention provides a winding overhang machining method, a winding overhang structure and a stator assembly. The method includes: cutting off corners of tip portions of conductors to form welding surfaces which are angled with respect to axes of the respective conductors; exerting a pushing force on each of the conductors, which have been inserted through an iron core so as to protrude out of the iron core, to form a bend in a base portion of the conductor so that the welding surfaces of two of the bent conductors to be connected become contiguous and form a welding line; and connecting the two conductors together by performing laser welding on their welding surfaces.

With this arrangement, a winding overhang structure can be obtained by processing the tip portions of the conductors with pushing forces but not drag forces. This dispenses with the need to reserve drag areas on the tip portions, allowing the winding overhang to have a reduced height and hence a smaller overall outer size. Moreover, connecting the bent conductors by performing laser welding on the welding surfaces formed by cutting off corners of the tip portions of the conductors will not cause damage to any insulation layer around the welding surfaces, thus effectively enhancing winding reliability.

It is to be noted that the foregoing several embodiments may be combined. The description presented above is merely that of a few preferred embodiments of the present invention and is not intended to limit the scope thereof in any sense. Any and all changes and modifications made by those of ordinary skill in the art based on the above teachings fall within the scope as defined in the appended claims.

The invention claimed is:

1. A winding overhang machining method, comprising:

cutting off corners of tip portions of conductors to form welding surfaces which are angled with respect to axes of the respective conductors, wherein the tip portion of each of the conductors comprises a connecting surface facing towards the other one of the conductors, wherein the connecting surfaces of the two conductors are fully contacted with each other;

exerting a pushing force on each of the conductors, which have been inserted through an iron core so as to protrude out of the iron core, to form a bend in a base portion of the conductor so that the welding surfaces of two of the bent conductors to be connected together become contiguous and form a welding line;

connecting the two conductors together by performing laser welding on the welding surfaces, wherein during the laser welding, along an extension direction of the welding line, more energy is applied around a middle of the welding line than around two ends thereof; and forming a tip coating on the tip portions of the conductor, the tip coating covering the welding surfaces and backsides opposite to the connecting surface of the tip portion of the conductors, the winding overhang machining method further comprising thinning the tip portions of the conductors into wedge shapes so that the tip portions of the two conductors have opposing beveled sections which are slanted in a same direction.

2. The winding overhang machining method according to claim 1, wherein the two conductors to be connected together are bent so that their welding surfaces are coplanar and/or that the welding line is perpendicular to an axis of the iron core.

3. The winding overhang machining method according to claim 1, wherein, before the conductors are inserted through the iron core, the tip portion of each one of the conductors is subjected to a pre-processing step comprising thinning the tip portion of the conductor on a side facing towards another one of the conductors to be connected thereto, to form the connecting surface.

4. The winding overhang machining method according to claim 3, wherein the connecting surface extends in a direction forming an angle with an axis of the iron core.

5. The winding overhang machining method according to claim 1, wherein the step of exerting the pushing force on each of the conductors, which have been inserted through the iron core so as to protrude out of the iron core, to form the bend in the base portion of the conductor comprises:

exerting the pushing force on the tip portion of the conductor to form the bend in the base portion of the conductor until a final shape is obtained; or exerting a pushing force on the base portion of the conductor to form an initial bend in the base portion of the conductor; and then exerting a pushing force on the tip portion of the conductor to additionally bend the conductor at the base portion until a final shape is obtained; or exerting a pushing force on the base portion of the conductor to form an initial bend in the base portion of the conductor; and then successively exerting pushing forces on points on the conductor along a path leading from the base portion to the tip portion to additionally bend the conductor at the base portion until a final shape is obtained.

6. The winding overhang machining method according to claim 5, further comprising, before the pushing force is exerted on the base portion of the conductor, providing an auxiliary stopper and bringing the auxiliary stopper into abutment with the base portion of the conductor in a radial direction of the conductor.

7. The winding overhang machining method according to claim 6, wherein the auxiliary stopper is cylindrical.

8. The winding overhang machining method according to claim 1, wherein forming the tip coating on the tip portions of the conductor uses a coating process or a low-pressure overmolding process.

9. The winding overhang machining method according to claim 1, wherein during the formation of the bend in the base portion of each of the conductors, which have been axially inserted through the iron core so as to protrude out of the iron core, by exerting the pushing force on the conductor, only the pushing force is exerted, in order to avoid a creation of a bend, which is curved in an opposite direction to the bend formed in the base portion, in a portion of the conductor protruding out of the iron core.

10. The winding overhang machining method according to claim 1, applied to an I-pin winding, wherein both axis end portions of conductors in the I-pin winding are processed according to the winding overhang machining method.

11. A winding overhang structure, comprising two conductors connected together, each of the conductors inserted through an iron core so as to protrude out of the iron core, each of the conductors having a base portion where a bend is formed, each of the conductors comprising a tip portion having a welding surface formed by cutting off a corner of the conductor before the conductor is inserted through the iron core, the welding surface forming an angle with an axis of the conductor, the welding surfaces of the two conductors being contiguous with each other and forming a welding line, the two conductors connected together by performing laser welding on the welding surfaces, wherein the tip portion of each of the conductors comprises a connecting surface facing towards the other one of the conductors, wherein the connecting surfaces of the two conductors are fully contacted with each other, the winding overhang structure further comprising a tip coating formed on the tip portions of the conductors, the tip coating covering the welding surfaces and backsides opposite to the connecting surface of the tip portion of the conductors, the tip portions of the conductors are thinned into wedge shapes so that the tip portions of the two conductors have opposing beveled sections which are slanted in a same direction.

12. The winding overhang structure according to claim 11, wherein the connecting surface and a body of each conductor are located at different height in a direction in which the conductors are connected to each other, wherein the connecting surface is lower than the body of the conductor in the direction.

13. The winding overhang structure according to claim 11, wherein the conductors are flat wires each defining a width direction along a cross-sectional length thereof and a thickness direction along a cross-sectional width thereof, wherein each of the conductors is bent in the base portion in the width direction, and the connecting surfaces are located in the thickness direction of the flat wires.

14. The winding overhang structure according to claim 11, wherein a portion of each of the conductors that protrudes out of the iron core does not have a bend curved in an opposite direction to the bend in the base portion.

15. The winding overhang structure according to claim 11, applied to an I-pin winding comprising conductors, which are inserted through an iron core so as to protrude out of the iron core from opposite axial end portions thereof and each bent in the base portion, wherein the conductors protruding from the opposite axial end portions are bent in opposite directions.

16. The winding overhang structure according to claim 11, wherein the tip coating is an electrical insulator.

17. The winding overhang structure according to claim 11, wherein the connecting surfaces extend in a direction forming an angle with an axis of the iron core;

wherein each of the connecting surfaces comprises a beveled section and/or a curved section.

18. A stator assembly, comprising an iron core and a winding disposed on the iron core, the winding comprising conductors implemented in the winding overhang structure according to claim 11.

19. The stator assembly according to claim 18, comprising at least two conductor sets each formed by the conductors arranged circumferentially around the iron core at a same radius, the conductor sets arranged at different radial distances from the iron core, all the conductors in each conductor set bent in a same direction, conductors in adjacent two of the conductor sets bent in opposite directions, the conductors in each conductor set connected to the conductors in an adjacent one of the conductor sets in pairs;

wherein the conductors in different ones of conductor sets are aligned at same circumferential positions, wherein the conductors in each connected pair are spaced from each other by five of the circumferential positions.

* * * * *